(12) United States Patent
Tonouchi

(10) Patent No.: US 8,699,076 B2
(45) Date of Patent: Apr. 15, 2014

(54) IMAGE FORMING APPARATUS, SERVER, IMAGE FORMING SYSTEM, AND STORAGE MEDIUM, OUTPUTTING SUPERIMPOSED TEXT STRINGS IN A VARIABLE FORM PAGE

(75) Inventor: Masaharu Tonouchi, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1617 days.

(21) Appl. No.: 12/207,516

(22) Filed: Sep. 10, 2008

(65) Prior Publication Data

US 2009/0207436 A1 Aug. 20, 2009

(30) Foreign Application Priority Data

Feb. 14, 2008 (JP) .................................. 2008-033335

(51) Int. Cl.
*G06K 15/00* (2006.01)
*G06F 3/12* (2006.01)

(52) U.S. Cl.
USPC ........................................................ 358/1.18

(58) Field of Classification Search
None
See application file for complete search history.

(56) References Cited

U.S. PATENT DOCUMENTS 7,142,326 B2 * 11/2006 Bondy et al. ................. 358/1.18
8,018,461 B2 * 9/2011 Hess et al. .................... 345/467
2005/0141035 A1 * 6/2005 Buckley ....................... 358/1.18
2006/0193008 A1 * 8/2006 Osaka et al. ................. 358/1.18
2007/0109607 A1 * 5/2007 Mori ............................ 358/3.28

FOREIGN PATENT DOCUMENTS

| JP | 04-168073 A | 6/1992 |
| JP | 2002-062864 A | 2/2002 |
| JP | 2005-254499 A | 9/2005 |
| JP | 2006-338569 A | 12/2006 |
| JP | 2006-338570 A | 12/2006 |
| JP | 2007-041911 A | 2/2007 |
| JP | 2007-130947 A | 5/2007 |

OTHER PUBLICATIONS

Japanese Office Action dated Feb. 23, 2010 for Japanese Patent Application No. 2008-033335 and English-language translation.

* cited by examiner

*Primary Examiner* — Benny Q Tieu
*Assistant Examiner* — Sunil Chacko
(74) *Attorney, Agent, or Firm* — Sughrue Mion, PLLC

(57) ABSTRACT

An image forming apparatus comprises: a first specifying unit that, in a document of a plurality of sets represented by document data, specifies definite form portions whose images are identical in each set of the plurality of sets; a second specifying unit that, in a document of a plurality of sets represented by document data, specifies variable portions whose images are to be substituted in each set of the plurality of sets; and an output unit that outputs a definite form portion page having an image of the definite form portion specified by the first specifying unit and a variable portion page having an image of the variable portion specified by the second specifying unit.

4 Claims, 14 Drawing Sheets

FIG.8

```
<PPML>
 <JOB>
  <REUSABLE_OBJECT>
   <OBJECT Position="0 0">
    <SOURCE Format="application/pdf" Dimension="w1 h1">
     < EXTERNAL_DATA Src="logo_1.pdf"/>
    </SOURCE>
   </OBJECT>
   <OCCURRENCE_LIST>
    <OCCURRENCE NAME="logo_1" Weight="100">
     <VIEW>
     <CLIP_RECT Rectangle="a1 b1 c1 d1"/>
     </VIEW>
    </OCCURRENCE>
   </OCCURRENCE_LIST>
  </REUSABLE_OBJECT>
 <DOCUMENT>
  <PAGE>
   <PAGE_DESIGN TrimBox="t1 t2 t3 t4"/>
    <MARK Position="x1 y1">
     <OCCRRENCE_REF Ref="logo_1"/>
    </MARK>
    <MARK Position="x2 y2">
     <OBJECT Position="0 0">
      <SOURCE Fromat="application/pdf" Dimension="w2 h2">
       <EXTERNAL_DATA Src="name_1.pdf">
      </SOURCE>
      <CLIP_RECT Rectangle="a2 b2 c2 d2"/>
     </OBJECT>
    </MARK>
  </PAGE>
  <PAGE>
   <PAGE_DESIGN TrimBox="t1 t2 t3 t4"/>
    <MARK Position="x3 y3">
     <OBJECT Position="0 0">
      <SOURCE Fromat="application/pdf" Dimension="w3 h3">
       <EXTERNAL_DATA Src="picture_1.pdf">
      </SOURCE>
      <CLIP_RECT Rectangle="a3 b3 c3 d3"/>
     </OBJECT>
    </MARK>
    <MARK Position="x4 y4">
     <OBJECT Position="0 0">
      <SOURCE Fromat="application/pdf" Dimension="w4 h4">
       <EXTERNAL_DATA Src="content_1.pdf">
      </SOURCE>
      <CLIP_RECT Rectangle="a4 b4 c4 d4"/>
     </OBJECT>
    </MARK>
  </PAGE>
 </DOCUMENT>
```

FIG. 9

```
<DOCUMENT>
 <PAGE>
  <PAGE_DESIGN TrimBox="t1 t2 t3 t4"/>
   <MARK Position="x1 y1">
    <OCCRRENCE_REF Ref="logo_1"/>
   </MARK>
   <MARK Position="x2 y2">
    <OBJECT Position="0 0">
     <SOURCE Fromat="application/pdf" Dimension="w2 h2">
      <EXTERNAL_DATA Src="name_2.pdf">
     </SOURCE>
     <CLIP_RECT Rectangle=" a2 b2 c2 d2"/>
    </OBJECT>
   </MARK>
 </PAGE>
 <PAGE>
  <PAGE_DESIGN TrimBox="t1 t2 t3 t4"/>
   <MARK Position="x3 y3">
    <OBJECT Position="0 0">
     <SOURCE Fromat="application/pdf" Dimension="w3 h3">
      <EXTERNAL_DATA Src="picture_2.pdf">
     </SOURCE>
     <CLIP_RECT Rectangle="a3 b3 c3 d3"/>
    </OBJECT>
   </MARK>
   <MARK Position="x4 y4">
    <OBJECT Position="0 0">
     <SOURCE Fromat="application/pdf" Dimension="w4 h4">
      <EXTERNAL_DATA Src="content_1.pdf">
     </SOURCE>
     <CLIP_RECT Rectangle=" a4 b4 c4 d4"/>
    </OBJECT>
   </MARK>
 </PAGE>
</DOCUMENT>
```

FIG. 10

```
<DOCUMENT>
 <PAGE>
  <PAGE_DESIGN TrimBox="t1 t2 t3 t4"/>
   <MARK Position="0 0">
   <OCCRRENCE_REF Ref="logo_1"/>
   </MARK>
   <MARK Position="x1 y1">
   <OBJECT Position="0 0">
    <SOURCE Fromat="application/pdf" Dimension="w2 h2">
     <EXTERNAL_DATA Src="name_1.pdf">
    </SOURCE>
    <CLIP_RECT Rectangle="a2 b2 c2 d2"/>
   </OBJECT>
   </MARK>
 </PAGE>
 <PAGE>
  <PAGE_DESIGN TrimBox="t1 t2 t3 t4"/>
   <MARK Position="x3 y3">
   <OBJECT Position="0 0">
    <SOURCE Fromat="application/pdf" Dimension="w3 h3">
     <EXTERNAL_DATA Src="picture_2.pdf">
    </SOURCE>
    <CLIP_RECT Rectangle="a3 b3 c3 d3"/>
   </OBJECT>
   </MARK>
   <MARK Position="x4 y4">
   <OBJECT Position="0 0">
    <SOURCE Fromat="application/pdf" Dimension="w4 h4">
     <EXTERNAL_DATA Src="content_3.pdf">
    </SOURCE>
    <CLIP_RECT Rectangle="a4 b4 c4 d4"/>
   </OBJECT>
   </MARK>
 </PAGE>
</DOCUMENT>
```

FIG. 11

```
<DOCUMENT>
 <PAGE>
  <PAGE_DESIGN TrimBox="t1 t2 t3 t4"/>
   <MARK Position="0 0">
    <OCCRRENCE_REF Ref="logo_1"/>
   </MARK>
   <MARK Position="x1 y1">
    <OBJECT Position="0 0">
     <SOURCE Fromat="application/pdf" Dimension="w2 h2">
      <EXTERNAL_DATA Src="name_1.pdf">
     </SOURCE>
     <CLIP_RECT Rectangle="a2 b2 c2 d2"/>
    </OBJECT>
   </MARK>
 </PAGE>
 <PAGE>
  <PAGE_DESIGN TrimBox="t1 t2 t3 t4"/>
   <MARK Position="x3 y3">
    <OBJECT Position="0 0">
     <SOURCE Fromat="application/pdf" Dimension="w3 h3">
      <EXTERNAL_DATA Src="picture_2.pdf">
     </SOURCE>
     <CLIP_RECT Rectangle="a3 b3 c3 d3"/>
    </OBJECT>
   </MARK>
   <MARK Position="x4 y4">
    <OBJECT Position="0 0">
     <SOURCE Fromat="application/pdf" Dimension="w4 h4">
      <EXTERNAL_DATA Src="content_4.pdf">
     </SOURCE>
     <CLIP_RECT Rectangle="a4 b4 c4 d4"/>
    </OBJECT>
   </MARK>
 </PAGE>
</DOCUMENT>

</JOB>
</PPML>
```

| POSITION | IDENTIFICATION NUMBER | PAGE NUMBER | FILE NAME | SET NUMBER |
|---|---|---|---|---|
| x2y2 | 1 | 1 | name_1.pdf | 1 |
| | | | name_2.pdf | 2 |
| | | | name_3.pdf | 3 |
| | | | name_4.pdf | 4 |

| POSITION | IDENTIFICATION NUMBER | PAGE NUMBER | FILE NAME | SET NUMBER |
|---|---|---|---|---|
| x3y3 | 2 | 2 | picture_1.pdf | 1 |
| | | | picture_2.pdf | 2,3,4 |

| POSITION | IDENTIFICATION NUMBER | PAGE NUMBER | FILE NAME | SET NUMBER |
|---|---|---|---|---|
| x4y4 | 3 | 2 | content_1.pdf | 1 |
| | | | content_2.pdf | 2 |
| | | | content_3.pdf | 3 |
| | | | content_4.pdf | 4 |

FIG. 18
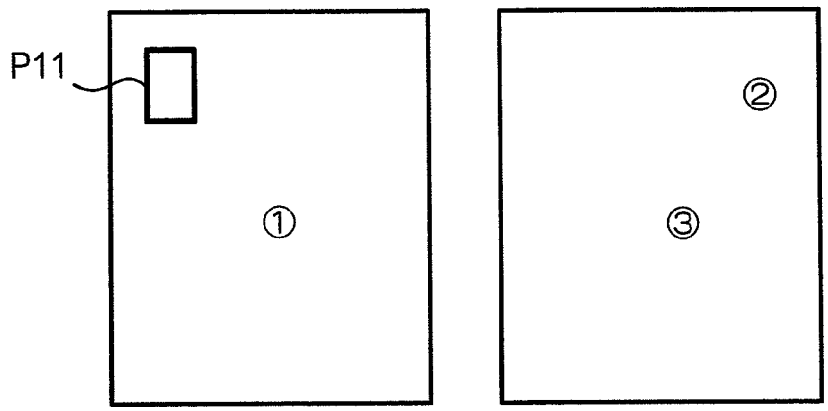
FIG. 19
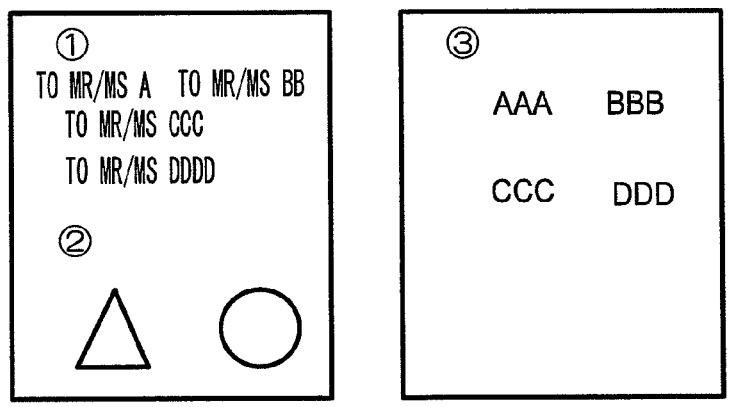
FIG. 20
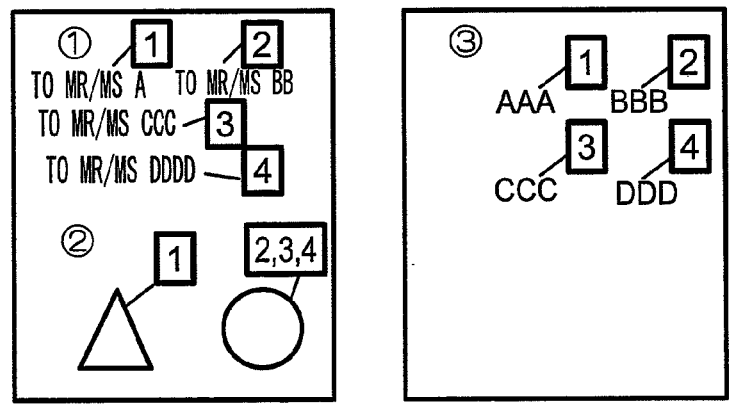
FIG. 21
| IDENTIFICATION NUMBER | | |
|---|---|---|
| 1 | TO MR/MS A | 1 |
| | TO MR/MS BB | 2 |
| | TO MR/MS CCC | 3 |
| | TO MR/MS DDDD | 4 |

FIG. 22
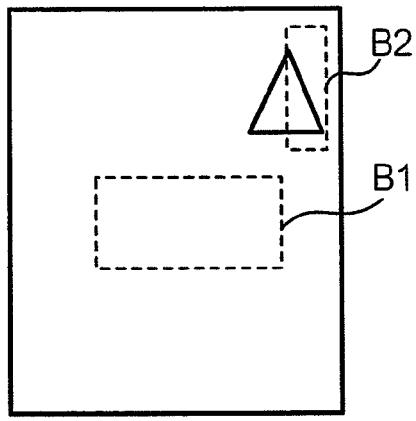
FIG. 23
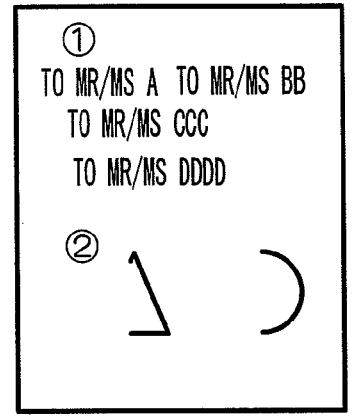
FIG. 24
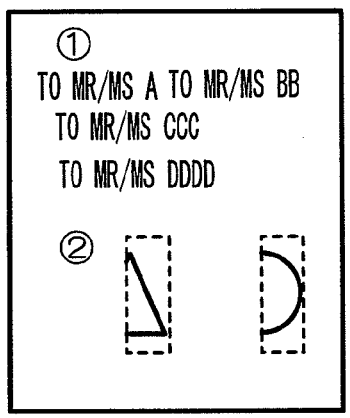
FIG. 25
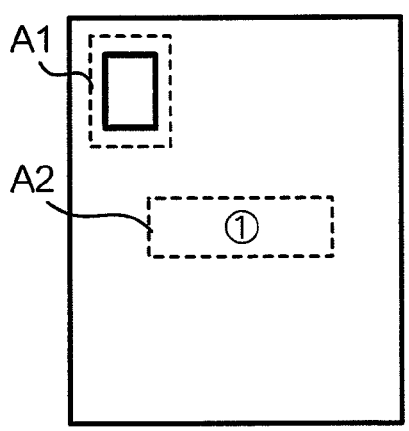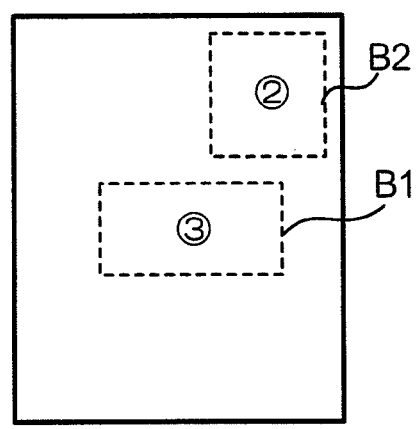

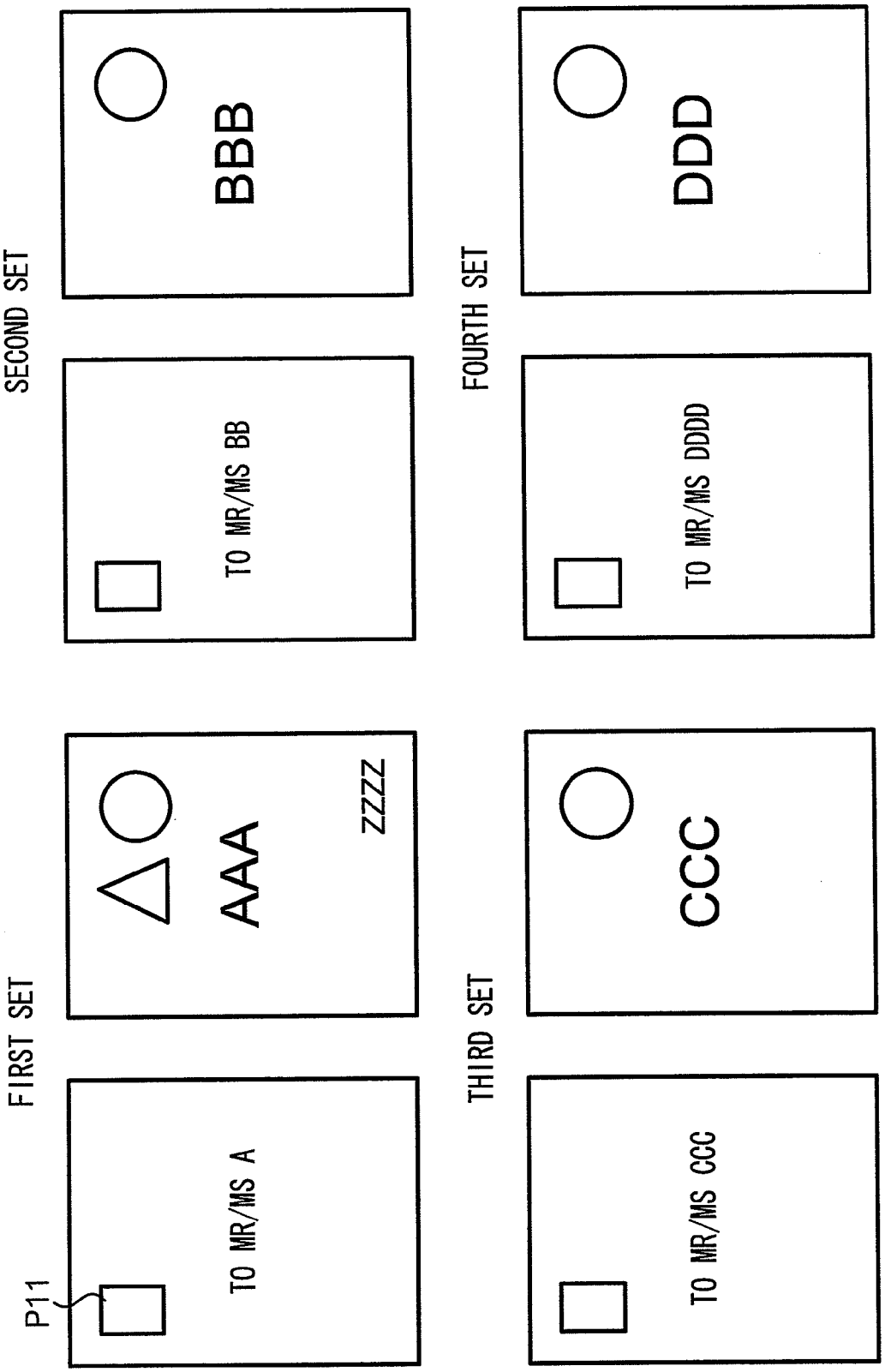

IMAGE FORMING APPARATUS, SERVER, IMAGE FORMING SYSTEM, AND STORAGE MEDIUM, OUTPUTTING SUPERIMPOSED TEXT STRINGS IN A VARIABLE FORM PAGE

CROSS-REFERENCE TO RELATED APPLICATIONS

This application is based on and claims priority under 35 U.S.C. 119 from Japanese Patent Application No. 2008-33335, which was filed on Feb. 14, 2008.

BACKGROUND

1. Technical Field

The present invention relates to image forming apparatuses, servers, image forming systems, and storage media.

2. Related Art

There is a technology known as variable printing in which, when outputting multiple sets of a document, a different document is created for each set by substituting an image of a certain portion of the document in each set.

SUMMARY

In an aspect of the present invention, there is provided an image forming apparatus including: a first specifying unit that, in a document of a plurality of sets represented by document data, specifies definite form portions whose images are identical in each set of the plurality of sets, a second specifying unit that, in a document of a plurality of sets represented by document data, specifies variable portions whose images are to be substituted in each set of the plurality of sets, and an output unit that outputs a definite form portion page having an image of the definite form portion specified by the first specifying unit and a variable portion page having an image of the variable portion specified by the second specifying unit.

BRIEF DESCRIPTION OF THE DRAWINGS

Exemplary embodiments of the present invention will be described in detail based on the following figures, wherein:

FIG. 8 is a diagram showing contents of an element group E11 and an element group E21;

FIG. 9 is a diagram showing contents of an element group E22;

FIG. 10 is a diagram showing contents of an element group E23;

FIG. 11 is a diagram showing contents of an element group E24;

FIG. 18 is a diagram illustrating pages in which positions where a definite form image and variable images are to be displayed are indicated;

FIG. 19 is a diagram illustrating pages in which variable images are indicated;

FIG. 20 is a diagram illustrating pages to be outputted according to a modified example of the present invention;

FIG. 21 is a diagram illustrating a page to be outputted according to a modified example of the present invention;

FIG. 22 is a diagram for describing a modified example of the present invention;

FIG. 23 is a diagram illustrating a page to be outputted according to a modified example of the present invention;

FIG. 24 is a diagram illustrating a page to be outputted according to a modified example of the present invention;

FIG. 25 is a diagram illustrating pages to be outputted according to a modified example of the present invention;

FIG. 28 is a diagram for describing a modified example of the present invention.

DETAILED DESCRIPTION

Configuration of Exemplary Embodiment

Figure 1:
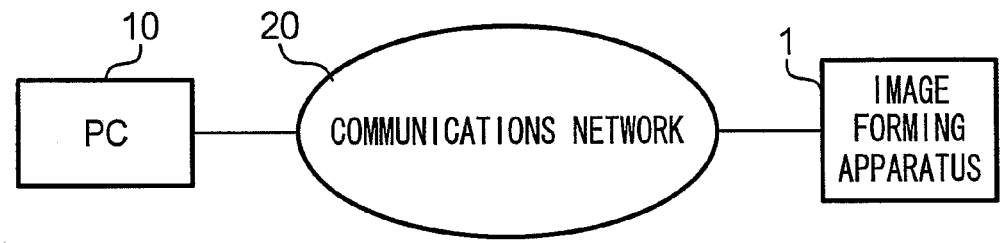
FIG. 1 is a configuration diagram of a system having an image forming apparatus 1 according to one exemplary embodiment of the present invention.

FIG. 1 is a diagram illustrating a configuration of a system having an image forming apparatus 1 according to one exemplary embodiment of the present invention. As shown in this diagram, the system has the image forming apparatus 1, a PC 10, and a communications network 20, with the PC 10 and the image forming apparatus 1 being capable of carrying out communications via the communications network 20.

The image forming apparatus 1 is an image forming apparatus provided with an image forming function by which an image is formed on a recording medium such as paper in accordance with various types of data that are inputted.

The PC (personal computer) 10 is a computer apparatus provided with a display device that displays text and images, and executes various application programs run on an operating system, and it stores a document creating program that achieves a document creating function as an application program.

Configuration of Image Forming Apparatus 1

Figure 2:
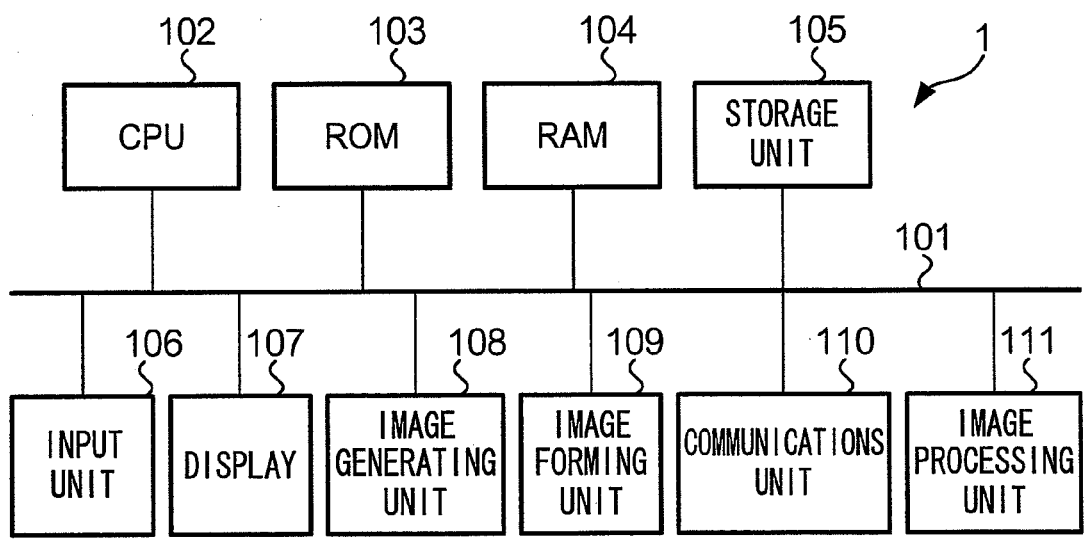
FIG. 2 is a block diagram showing a hardware configuration of the image forming apparatus 1.

FIG. 2 is a block diagram showing a configuration of principal components of the image forming apparatus 1 according to an exemplary embodiment of the present invention. As shown in this diagram, each unit of the image forming apparatus 1 is connected to a communications line 101, and various types of data are exchanged between each unit via this communications line 101.

An input unit 106 is provided with various keys for operating the image forming apparatus 1. Input of various instructions to the image forming apparatus 1 and various settings of the image forming apparatus 1 are performed by a user operating these keys.

A display 107 has a liquid crystal display as a display device and, under the control of a CPU 102, displays various menu screens and various messages and the like for operating the image forming apparatus 1.

A communications unit 110 is connected to the communications network 20. The communications unit 110 carries out communications with the PC 10 via the communications network 20 and functions as a communications interface by which various types of data are exchanged.

An image processing unit 111 executes image processing such as color correction, tone correction, and screen processing on images represented by image data that is inputted. And, from the image that has undergone image processing, image data is generated for images of each of the colors Y (yellow), M (magenta), C (cyan), and K (black) and outputted to an image forming unit 109.

An image generating unit 108 is constituted by a DSP (digital signal processor) and is provided with a function by which a file that represents an image or document data that represents a document described in a page description language is interpreted to generate an image.

Furthermore, the image generating unit 108 is provided with a combining function by which document data is interpreted and an image is generated and outputted in which an image of a definite form portion (definite form image) and an image of a variable portion (variable image) are combined, and a function by which document data is interpreted and images of definite form portions and images of variable portions are outputted separately.

The image forming unit 109 is equipped with an image forming mechanism (omitted from drawings) that forms a toner image on a recording medium such as paper using an electrographic system. Specifically, the image forming mechanism includes an image forming mechanism that forms a Y (yellow) color toner image, an image forming mechanism that forms an M (magenta) color toner image, an image forming mechanism that forms a C (cyan) color toner image, and an image forming mechanism that forms a K (black) color toner image. In each of these image forming mechanisms, an electrostatic latent image is formed on a photosensitive member in accordance with image data that is inputted, after which toner is caused to adhere to the photosensitive member to form a toner image of each of the colors, Y, M, C, and K. Then, the toner images are transferred to the recording medium, which has been transported from a recording media storage unit (omitted from drawings). Then, after the transferred toner images are fixed to the recording medium by applying heat and pressure, the recording medium on which the toner images have been formed is discharged outside the image forming apparatus 1.

A storage unit 105 is equipped with a hard disk device and stores various types of data such as data and files received by the communications unit 110.

A ROM 103 stores a control program to be executed by the CPU 102. The CPU 102 reads out the control program stored in the ROM 103 and executes the control program using a RAM 104 as a work area. When the control program is executed by the CPU 102, the units of the image forming apparatus 1 are controlled by the CPU 102 and it becomes possible to form and output an image on the recording medium.

Configuration of PC 10

Figure 3:
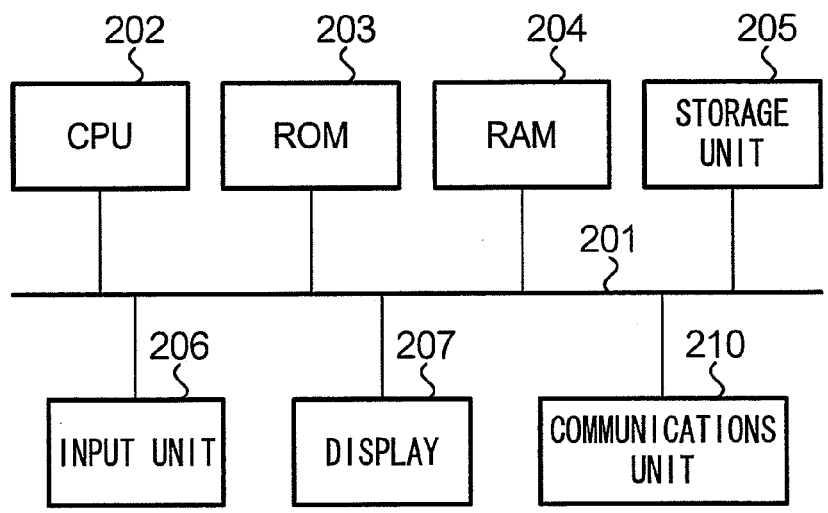
FIG. 3 is a block diagram showing a hardware configuration of a PC 10.

FIG. 3 is a block diagram illustrating a hardware configuration of principal components of the PC 10. As shown in this diagram, each unit of the PC 10 is connected to a bus 201, and data and messages are exchanged between each unit via this bus 201.

An input unit 206 is provided with input devices such as a keyboard and a mouse for operating the PC 10. Input of various instructions and information to the PC 10 is carried out by an operator of the PC 10 operating these input devices.

A display 207 has a liquid crystal display as a display device and, under the control of a CPU 202, displays various menu screens and messages and the like for operating the PC 10. It should be noted that the display device is not limited to a liquid crystal display, and other display devices such as a CRT (cathode ray tube) and EL (electro-luminescence) display may be used.

A communications unit 210 is connected to the communications network 20 and functions as a communications interface for carrying out communications via the communications network 20 such that various types of data and files are sent to the image forming apparatus 1.

A storage unit 205 is equipped with a hard disk device and stores an OS (operating system) program, which is a program for controlling the various units of the PC 10 and is executed by the CPU 202. Furthermore, the storage unit 205 stores the aforementioned document creating program.

A ROM 203 stores an IPL (initial program loader). When a power source of the PC 10 is turned on, the CPU 202 reads out and starts up the IPL from the ROM 203. When the IPL is started up by the CPU 202, the OS program stored in the storage unit 205 is read out and executed, thereby achieving a basic functionality as a computer apparatus for functions such as input/output functions, control of the storage unit 205, and communications functions for carrying out communications via the communications network 20.

Furthermore, when the document creating program is executed by the CPU 202, the PC 10 achieves functions including a function by which text and diagrams and the like are inputted and the inputted text and diagrams are arranged to create a document, a function of creating a document (hereinafter referred to as a variable document) having an image of a definite form portion and an image of a variable portion, a function of creating and editing the image of the variable portion in the document, a function of creating and editing the image of the definite form portion in the document, a function generating data and files that represent a variable document, and a function of instructing output of the variable document to the image forming apparatus 1.

Figure 4:
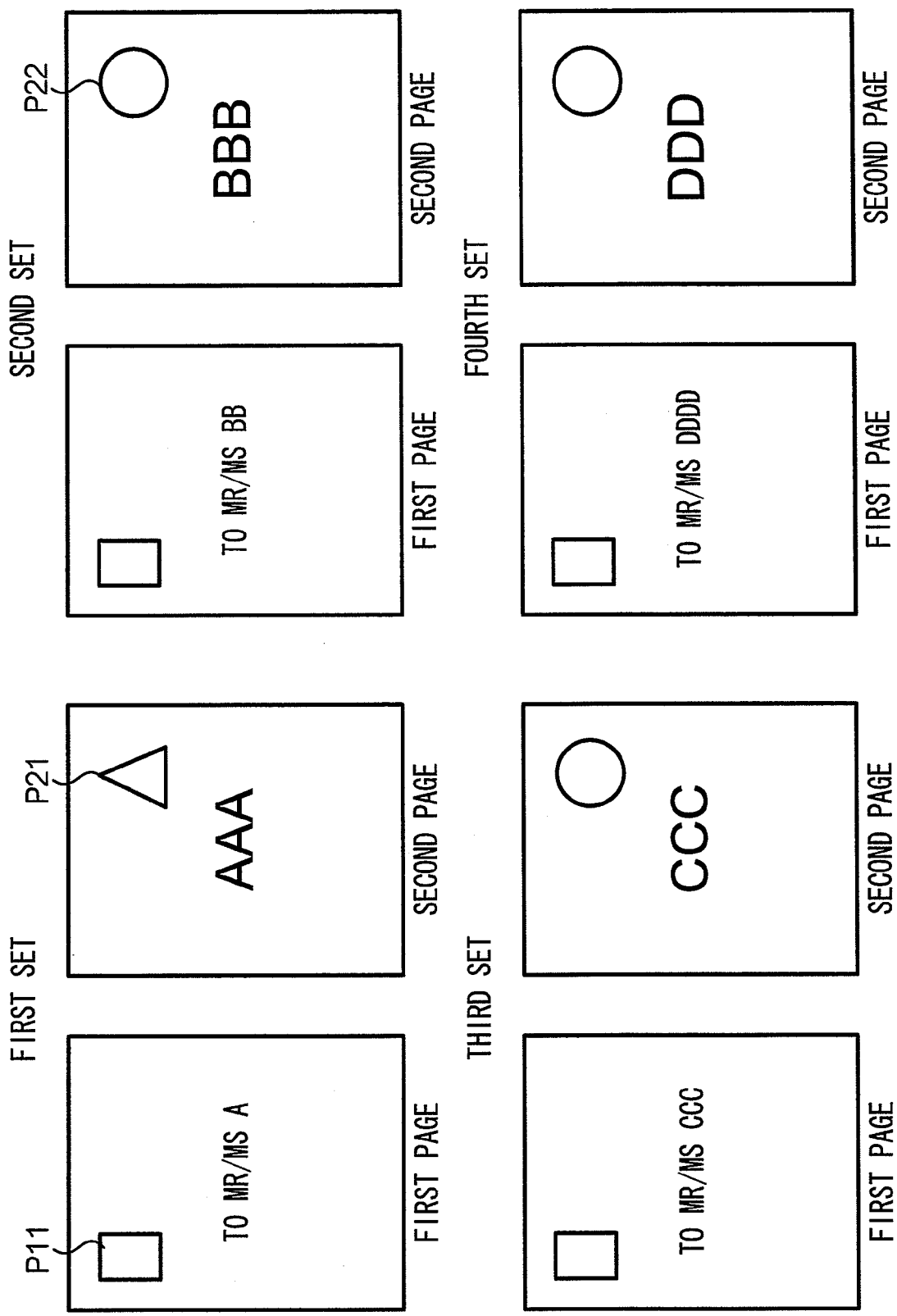
FIG. 4 is a diagram illustrating a variable document.
Figure 5:
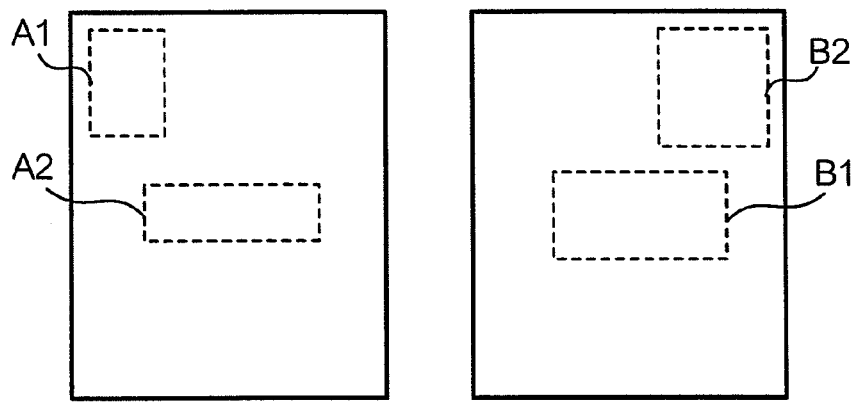
FIG. 5 is a diagram showing multiple regions in the variable document.

Here, description is given regarding a structure of a variable document according to the present exemplary embodiment. FIG. 4 shows one example of a variable document created by the PC 10 on which a document creating program has been executed. This variable document is constituted by four sets and each set has two pages. In each page, regions are set in which an image of a diagram or text is to be formed. Specifically, as shown in FIG. 5, a region A1 and region A2 are set on the first page and a region B1 and B2 are set on the second page.

The region A1 is a region in which an image of a diagram is to be formed, this being a definite form image common to the first to fourth sets. The region A2 and the region B1 are regions in which images of text are to be formed, and the region B2 is a region in which an image of a diagram is to be formed. In the region A2 and the region B1, the images of text are substituted for each of the first to fourth sets such that an image of different text is formed in each set. Furthermore, in the region B2, the images of diagrams are substituted for each of the first to fourth sets such that a different image is formed in each set. It should be noted that in the region B2, an image of a same diagram is substituted for each of the second to fourth sets.

Figure 6:
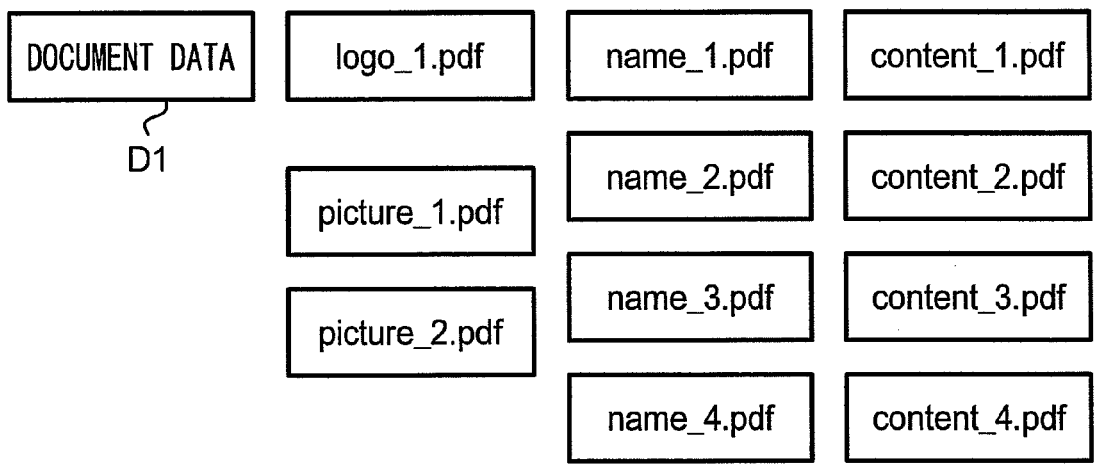
FIG. 6 is a diagram showing a structure of data and files that represent a variable document.

FIG. 6 is a diagram showing a structure of data and files that represent the variable document shown in FIG. 4. As shown in this diagram, the variable document is constituted by document data D1, which represents the structure of the variable document described in accordance with PPML (personalized print markup language), and PDF (portable document format) files that represent the images of text and diagrams in the variable document.

In FIG. 6, "logo_1.pdf" is a file that represents a definite form image PIt to be formed in the region A1. Furthermore, "picture_1.pdf" is a file that represents a variable image P21 to be formed in the region B2 and "picture_2.pdf" is a file that represents a variable image P22 to be formed in the region B2.

Furthermore, "name_1.pdf" is a file that represents a text string ("To Mr/Ms A") of the region A2 in the first set, "name_2.pdf" is a file that represents a text string ("To Mr/Ms BB") of the region A2 in the second set, "name_3.pdf" is a file that represents a text string ("To Mr/Ms CCC") of the region A2 in the third set, and "name_4.pdf" is a file that represents a text string ("To Mr/Ms DDDD") of the region A2 in the fourth set.

Furthermore, "content_1.pdf" is a file that represents a text string ("AAA") of the region B1 in the first set, "content_2.pdf" is a file that represents a text string ("BBB") of the region B1 in the second set, "content_3.pdf" is a file that represents a text string ("CCC") of the region B 1 in the third set, and "content_4.pdf" is a file that represents a text string ("DDD") of the region B1 in the fourth set.

Figure 7:
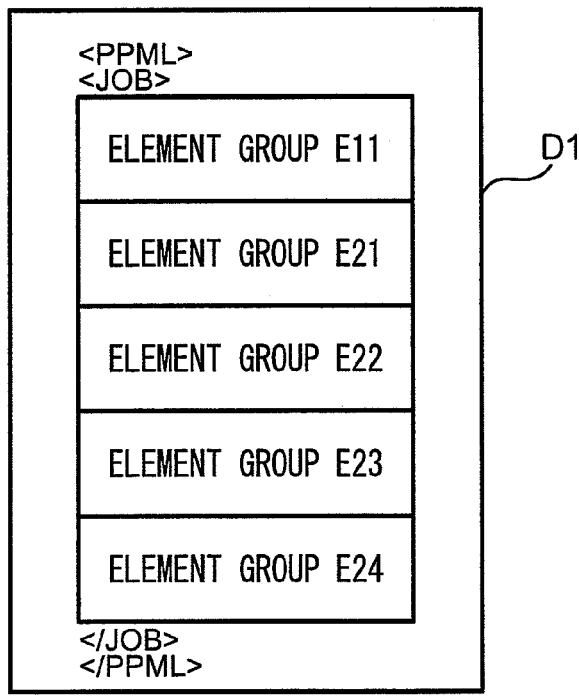
FIG. 7 is a schematic diagram showing a data structure of document data D1.

FIG. 7 is a diagram showing an overall data structure of the document data D1. As shown in this diagram, the document data D1 has element groups E11 and E21 to E24. The element group E11 defines images of definite form portions used in common in the first to fourth sets. And the element groups E21 to E24 define document structures of the first to fourth set of the variable document.

FIG. 8 is a diagram showing contents of the element group E11 and the element group E21, and FIG. 9 shows contents of the element group E22, FIG. 10 shows contents of the element group E23, and FIG. 11 shows contents of the element group E24. The element group E11 refers to tags between the tag <REUSABLE_OBJECT> and </REUSABLE_OBJECT>, and specifies "logo_1.pdf" as an image of a definite form portion with the tag <EXTERNAL DATA>, and defines a name of the image of the definite form portion with the tag <OCCURRENCE>.

Furthermore, the element group E21 refers to tags between the <DOCUMENT> tag and </DOCUMENT>, and defines the first set of the document. Between the <DOCUMENT> tag and </DOCUMENT>, tags between a <PAGE> tag and </PAGE> of a first group define the first page of the first set, with the region A1 being defined between a first <MARK> tag and a </MARK> tag and the region A2 being defined between a second <MARK> tag and a </MARK> tag. Furthermore, between the <DOCUMENT> tag and </DOCUMENT>, tags between a <PAGE> tag and </PAGE> of a second group define the second page of the first set, with the region B1 being defined between a first <MARK> tag and a </MARK> tag and the region B2 being defined between a second <MARK> tag and a </MARK> tag.

The element groups E22 to E24 shown in FIG. 9 to FIG. 11 define the second set to the fourth set of the document. The arrangement of tags in the element groups E22 to E24 is equivalent to the element group E21, but the file names of files that specify an image to be formed in a region are different from the element group E21.

Operation of Exemplary Embodiment

Hereinafter, description is given regarding operation of the present exemplary embodiment. It should be noted that in the following description, description is given first regarding an operation in which a variable document is sent from the PC 10 to the image forming apparatus 1. Next, description is given regarding an operation in which images of definite form portions and images of variable portions of the variable document are outputted separately, after which description is given regarding an image forming operation of the variable document.

Sending Variable Document from PC 10 to Image Forming Apparatus 1

Figure 12:
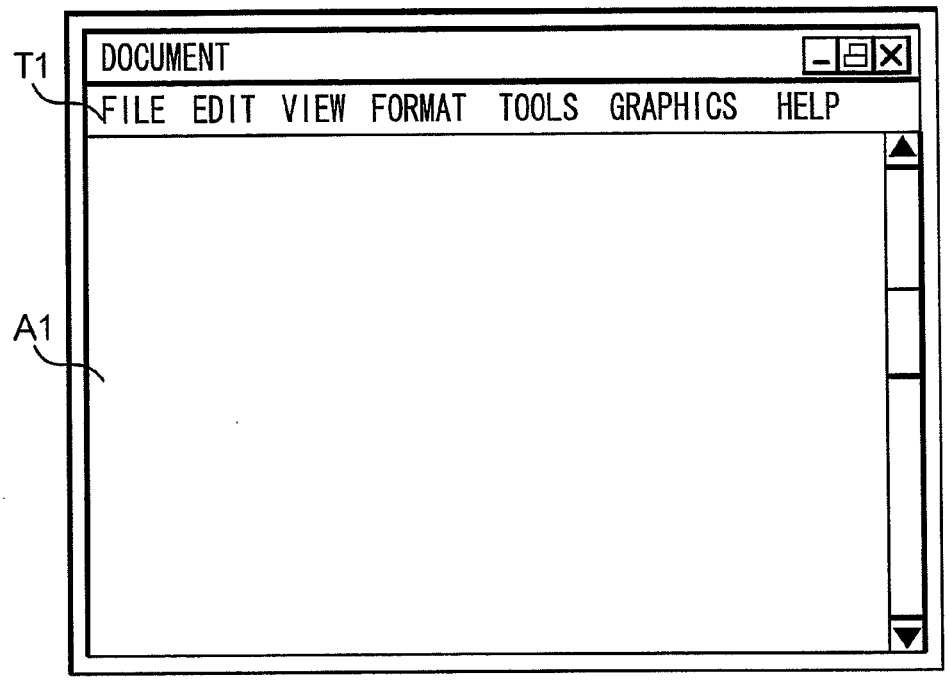
FIG. 12 is a diagram illustrating a screen displayed on the PC 10.

First, when an operation is carried out by an operator at the input unit 206 of the PC 10 instructing execution of the document creating program, the document creating program is read out from the storage unit 205 and executed by the CPU 202 such that a screen (FIG. 12), which is provided with an input region A1 for inputting text and diagrams and a toolbar T1, is displayed on the display 207.

Figure 13:
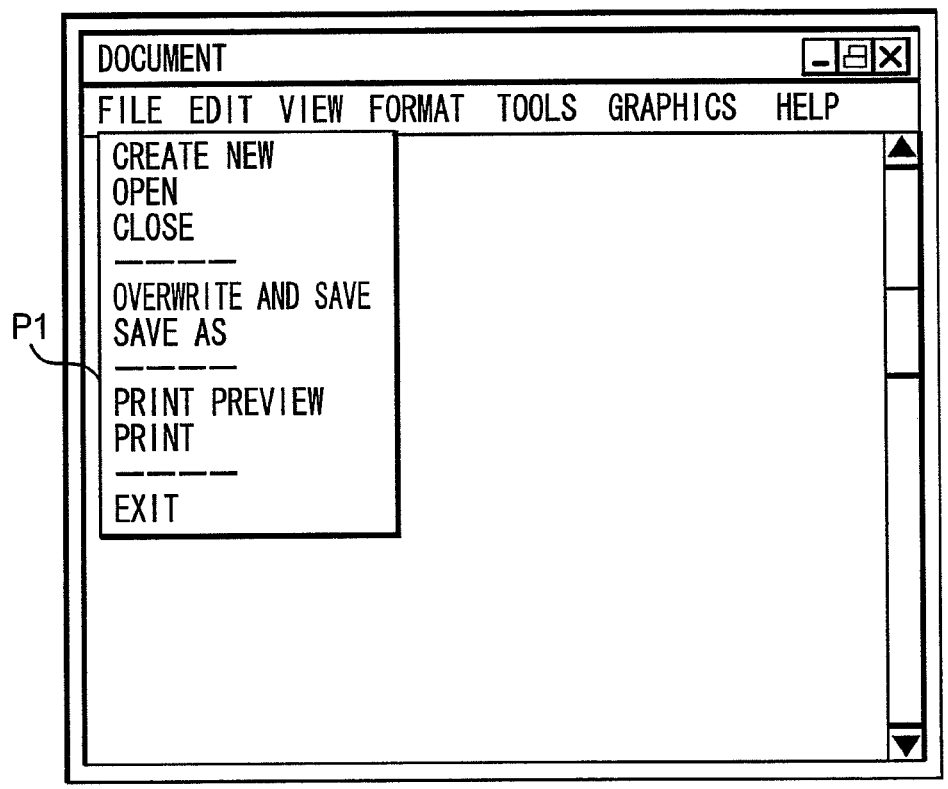
FIG. 13 is a diagram illustrating a screen displayed on the PC 10.

Next, when the operator operates the input unit 206 to carry out an operation of clicking a "file" item on the toolbar T1 on the screen, a pull-down menu P1 (FIG. 13) is displayed. Then, when the operator carries out an operation of clicking an "open" item in the pull-down menu P1, a menu screen is displayed for opening a file. Here, when the operator carries out an operation of opening the document of FIG. 4, which has been created in advance, the first set of the document in FIG. 4 is displayed.

Figure 14:
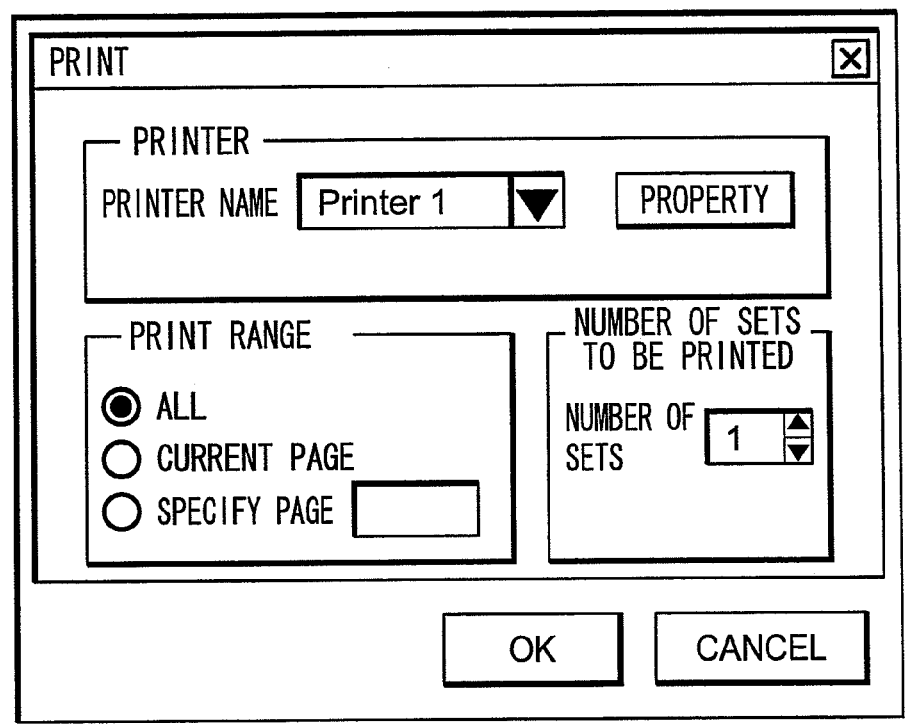
FIG. 14 is a diagram illustrating a screen displayed on the PC 10.

Next, when the operator carries out an operation of clicking the "file" item on the toolbar T1 on the screen and carries out an operation of clicking a "print" item in the pull-down menu P1, a menu screen (FIG. 14) for performing settings relating to printing is displayed. After this, when the operator carries out an operation of clicking an "OK" button on the screen, document data D1 of the contents shown in FIGS. 8 to 11 and the multiple PDF files shown in FIG. 5 are generated.

When the document data D1 and the multiple PDF files are generated, the PC 10 sends the document data D1 and the PDF files that have been generated to the image forming apparatus 1 via the communications network 20. Then, in the image forming apparatus 1, the document data D1 and the PDF files sent from the PC 10 are received by the communications unit 110, and the document data D1 and the PDF files that have been received are stored in the storage unit 105.

Operation in which Images of Definite Form Portions and Images of Variable Portions are Outputted Separately Next, description is given regarding the operation of the image forming apparatus 1.

When the image forming apparatus 1 stores the document data D1 and the PDF files sent from the PC 10, it stands by for instruction from the operator to be inputted. Then, when an operation is carried at the input unit 106 instructing that images of definite form portions and images of variable portions of the variable document are to outputted separately, the image forming apparatus 1 analyzes the document data D1 stored in the storage unit 105, then separately generates pages having images of definite form portions and pages having images of variable portions.

Figure 15:
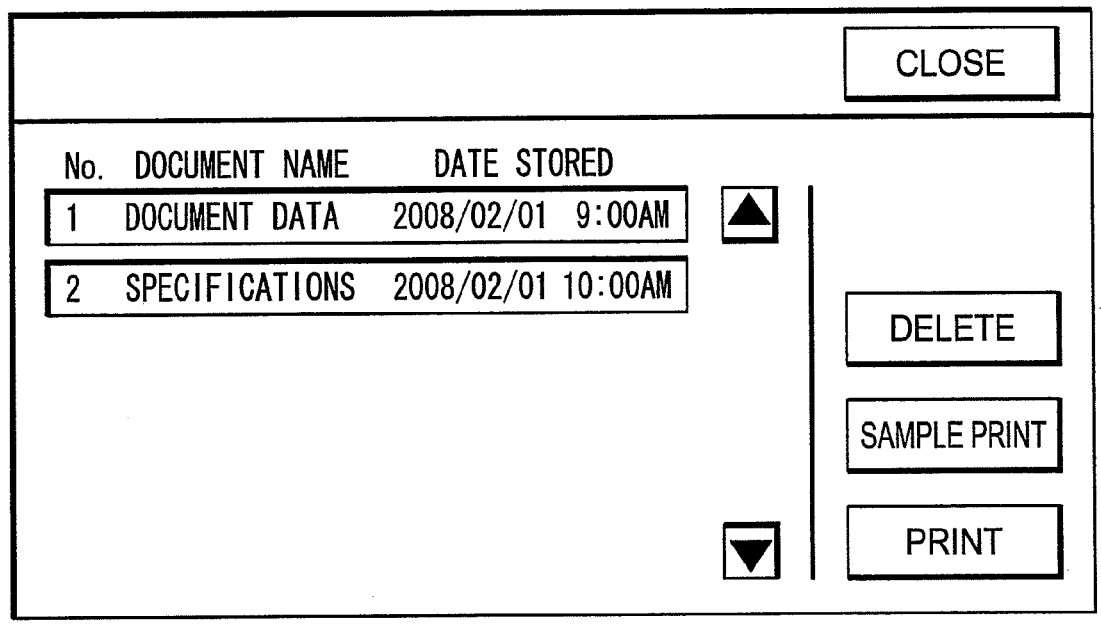
FIG. 15 is a diagram illustrating a screen displayed on a display 107.

Specifically, first, when the operator carries out an operation at the input unit 106 to display a list of document data stored in the image forming apparatus 1, a list of document data stored in the storage unit 105 is displayed as illustrated in FIG. 15.

Figures 16, 17:
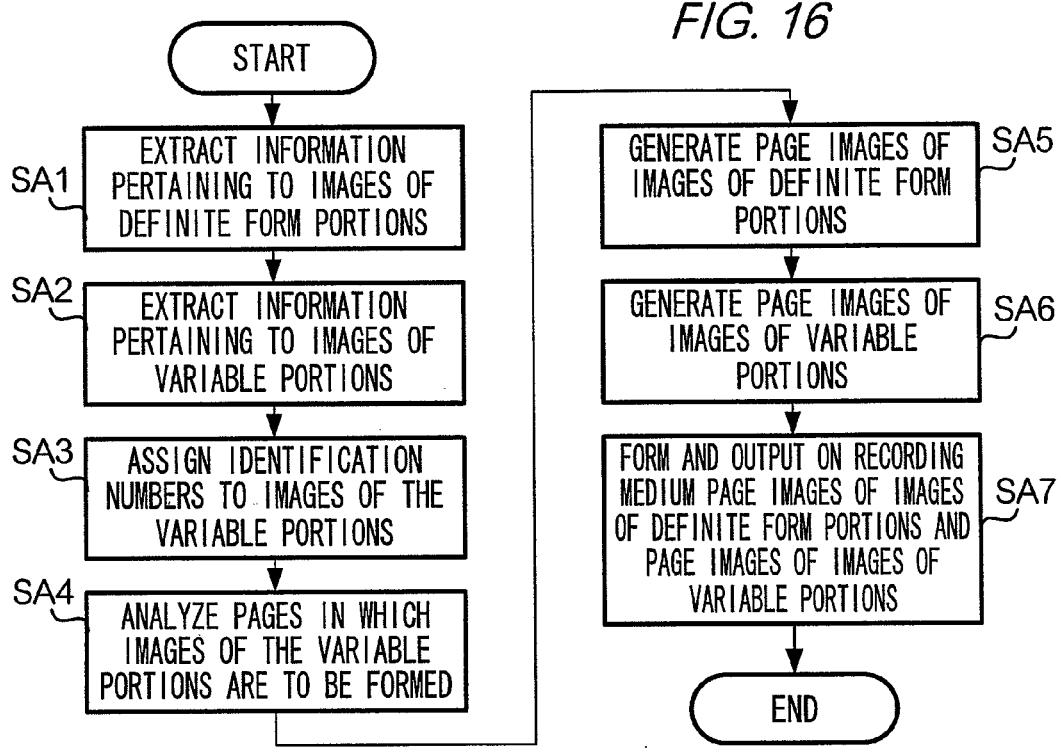
FIG. 16 is a flowchart showing a flow of processing carried out by the image forming apparatus 1.
FIG. 17 is a diagram showing data stored in a RAM 104.

Here, when the operator carries out an operation of pressing a sample print button in FIG. 15 after carrying out an operation of selecting the document data D1 from the list of displayed document data, the image forming apparatus 1 extracts information pertaining to images of definite form portions from the document data D1 (FIG. 16: step SA1). In the document data D1, images of definite form portions are defined by the tags of the element group E11, and names are assigned to the images of definite form portions using a "NAME" attribute of the <OCCURRENCE> tag. The image forming apparatus 1 first searches for a <REUSABLE_OBJECT> tag within the document data D1, and the name defined by the "NAME" attribute of the <OCCURRENCE> tag described subsequent to the thus-retrieved tag is stored in the RAM 104. Furthermore, the image forming apparatus 1 specifies an <EXTERNAL_DATA> tag described subsequent to the <REUSABLE_OBJECT> tag, and the file name described by this tag is stored in the RAM 104.

In the document data D1 shown in FIG. 8, the file name of the image of the definite form portion is "logo_1.pdf" and the name is defined as "logo-I," and therefore the name "logo_1" and the file name "logo_1.pdf" are stored in the RAM 104. It should be noted that in the document data D1 shown in FIG. 4, the number of images for definite form portions is one, but in a case where there are multiple images defined by the <REUSABLE_OBJECT> tag, a file name and name are stored for each of the multiple images.

Next, the image forming apparatus 1 searches for tags that include the name stored in the RAM 104, then extracts a page number and position in page of pages having an image of this name. In the case of the document data D1 shown FIG. 8, the position of the definite form image is defined by <MARK Position="x1 y1">, which is before <OCCURRENCE_REF Ref="logo_2"/>. The image forming apparatus 1 associates this defined position "x1 y1" with the "log_1" and stores these in the RAM 104. Furthermore, it is evident that, of the two groups of the <PAGE> tag and the </PAGE> tag between the <DOCUMENT> tag and </DOCUMENT>, the <OCCURRENCE_REF Ref="log_1"/> is described between the first group and in on the first page. Accordingly, the image forming apparatus 1 associates "1," which indicates that this is the first page, with the "logo_1" and stores these in the RAM 104.

It should be noted that in the document data D1 shown in FIG. 4, the number of images for definite form portions is one, but in a case where there are multiple images defined by the <REUSABLE_OBJECT> tag, an image position and page number is extracted for each of the multiple images, then associated with the name of the image and stored in the RAM 104.

When the image forming apparatus 1 extracts the name and position of the definite form image, it next extracts a position on the page of the images of the variable portions (step SA2).

First, the image forming apparatus 1 specifies <EXTERNAL_DATA> tags described after the <DOCUMENT> tag in the document data D1. Then, it extracts the file name described by a "Src" attribute of the specified tags and extracts the position described by a "Position" attribute of a <MARK> tag described immediately before the <EXTERNAL DATA> tag whose file name has been extracted. Then, it associates the extracted position on the page and the file name and stores these in the RAM 104.

For example, "name_1.pdf" is extracted as a file name of an image of a variable portion from the first page of the first set and "x2 y2" is extracted as the position of this image. Furthermore, "picture_1.pdf" and "content_1.pdf" are extracted as file names of images of variable portions from the second page of the first set, and "x3 y3" is extracted as the position of the image of "picture_1.pdf" and "x4 y4" is extracted as the position of the image of "content_1.pdf."

It should be noted that file names and positions of images of variable portions are extracted in a same manner for the second set to fourth set.

When the image forming apparatus 1 extracts the file names and positions of the images of the variable portions, it sorts the file names of images of the variable portions for each position, associates the position and the file name, and stores these in the RAM 104.

In the case of the document data D1 shown in FIG. 4, "name_1.pdf," "name_2.pdf," "name_3.pdf," and "name_4.pdf" are to be displayed in the position "x2 y2." Furthermore, "picture_1.pdf" and "picture_2.pdf" are to be displayed in the position "x3 y3," and "content_1.pdf," "content_2.pdf," "content_3.pdf," and "content_4.pdf" are to be displayed in the position "x4 y4."

Accordingly, the position "x2 y2" is associated with "name_1.pdf," "name_2.pdf," "name_3.pdf," and "name_4.pdf" and stored, "x3 y 3" is associated with "picture_1.pdf" and "picture_2.pdf" and stored, and "x4y4" is associated with "content_1.pdf," "content_2.pdf," "content_3.pdf," and "content_4.pdf" and stored.

When the image forming apparatus 1 has completed associating the file names and positions of images of the variable portions, it associates with each file a number indicating which document in which set of the document the file is to be used.

Specifically, first, the image forming apparatus 1 analyzes the document data D1 from the beginning and identifies a groupings of <DOCUMENT> tags and </DOCUMENT> tags. When the image forming apparatus 1 identifies one of these groupings, it extracts the files names between the identified grouping of the <DOCUMENT> tag and the </DOCUMENT>tag.

In the document data D1 shown in FIGS. 8 to 11, "name_1.pdf," "picture_1.pdf," and "content_1.pdf" are identified between the first identified grouping of the <DOCUMENT>tag and the </DOCUMENT> tag.

The image forming apparatus 1 associates "1", which is an order from the beginning of the document data D1 of the grouping of the <DOCUMENT> tag and the </DOCUMENT> tag in which these file names are described, with the file names stored in the RAM 104.

When the image forming apparatus 1 finishes associating the order from the beginning of files of the grouping of tags and the file names for one grouping of the <DOCUMENT> tag and the </DOCUMENT> tag, it analyzes whether or not there is another grouping of the <DOCUMENT> tag and the </DOCUMENT> tag, and in a case where there is another grouping of the <DOCUMENT> tag and the </DOCUMENT> tag, it carries out association of the order from the beginning of the document data D1 of the grouping of tags and the file names in the same manner as for the first grouping of tags. In this way, as shown in FIG. 17, file names, positions on the page at which the image of the file name is to be formed, and a number (set number) indicating which set of the document the image of the file name is to be formed are associated and stored in the RAM 104.

Next, the image forming apparatus 1 assigns an identification number that uniquely identifies each position to the positions of the images of variable portions stored in the RAM 104 (step SA3). In this way, as shown in FIG. 17, "1" is assigned to the position "x2 y2," "2" is assigned to the position "x3 y3," and "3" is assigned to the position "x4 y4."

After this, the image forming apparatus 1 analyzes on which page of the document the image of each sorted file is to be formed (step SA4).

For example, when looking at the element group E21, "name__1.pdf," for which "1" has been assigned as the identification number, is described between the first grouping of two groupings of <PAGE> and </PAGE> tags, and therefore it is determined as being described for the first page and "1" is associated with the identification number "1" as the page number as shown in FIG. 17.

Furthermore, when looking at the element group E21, "picture__1.pdf," for which "2" has been assigned as the identification number, is described between the second grouping of two groupings of <PAGE> and </PAGE> tags, and therefore it is determined as being described for the second page and "2" is associated with the identification number "2" as the page number as shown in FIG. 17.

Furthermore, when looking at the element group E21, "content__1.pdf," for which "3" has been assigned as the identification number, is described between the second grouping of two groupings of <PAGE> and </PAGE> tags, and therefore it is determined as being described for the second page and "2" is associated with the identification number "3" as the page number as shown in FIG. 17.

When the image forming apparatus 1 finishes the processing of step SA4, it generates a page image of the image of the definite form portion (step SA5), then generates a page image of the image of the variable portion (step SA6).

Specifically, for pages of images of definite form portions, first are read out the file names of images of definite form portions stored in the RAM 104, page numbers of pages having images of definite form portions, and position on the page of images of the definite form portions. Then, an image is generated in which images are arranged in the positions that have been read out for the file names that have been read out in the pages of the page numbers that have been read out.

Here, the file name "logo__1.pdf" of the image of the definite form portion, the page number "1" of the page having the image of the definite form portion, and the position "x1 y1" on the page of the image of the definite form portion are stored in the RAM 104, such that the image forming apparatus 1 generates an image in which "logo__1.pdf" is expressed in the position "x1 y1" on the first page in accordance with this information.

Next, from the RAM 104, the image forming apparatus 1 reads out information of the positions of images of variable portions, page numbers of pages having images of variable portions, and identification numbers of positions of images of variable portions. Then, it arranges the identification numbers that have been read out in positions that have been read out of pages that have been read out in images of pages in which images of definite form portions have been arranged. With this processing, images of definite form portions are arranged as shown in FIG. 18 for pages of images of definite form portions, and an image of the number assigned to each region of the variable portions is arranged in the positions in which the images of the variable portions are to be displayed (step SA5).

When the processing of step SA5 finishes, the image forming apparatus 1 generates images of the pages of images of the variable portions (step SA6).

Specifically, it reads out the identification numbers assigned to positions of images of the variable portions stored in the RAM 104 and the file names of images of variable portions that are associated with the identification numbers. Then, it generates images indicating the identification numbers and images of files specified by the file names that have been read out, and generates an image in which the identification numbers and the variable images are associated.

For example, the identification number "1" and the file names "name__1.pdf," "name__2.pdf," "name__3.pdf," and "name__4.pdf" are read out for the position "x2 y2."

Furthermore, the identification number "2" and the file names "picture__1.pdf," and "picture__2.pdf" are read out for the position "x3 y3."

And the identification number "3" and the file names "content__1.pdf," "content__2.pdf," "content__3.pdf," and "content__4.pdf" are read out for the position "x4 y4."

Then, for the identification number "1," an image is generated associated with a text string of "To Mr/Ms A," "To Mr/Ms BB," "To Mr/Ms CCC," and "To Mr/Ms DDDD," which is an image represented by the identification number "1" and "name__1.pdf," "name__2.pdf," "name__3.pdf," and "name__4.pdf" as shown in FIG. 19.

Furthermore, for the identification number "2," images are generated associated with a triangle and a circle, which are images represented by the identification number "2" and "picture__1.pdf" and "picture__2.pdf" as shown in FIG. 19.

And for the identification number "3," images are generated associated with a text string of "AAA," "BBB," "CCC," and "DDD," which are images represented by the identification numbers and "content__1.pdf," "content__2.pdf," "content__3.pdf," and "content__4.pdf" as shown in FIG. 19.

In the image forming apparatus 1, the images of pages generated at step SA5 and step SA6 are sent to the image processing unit 111. The image processing unit 111 executes image processing such as tone correction and screen processing on images that have been sent. Then, the image processing unit 111 generates images of each of the colors Y (yellow), M (magenta), C (cyan), and K (black) from the images that have undergone image processing and outputs each of these images to the image forming unit 109. When it receives the images, the image forming unit 109 forms toner images of the received images on the recording paper, and the recording paper on which the toner images have been formed is discharged outside the image forming apparatus 1 (step SA7).

Here, a total of four pages of content of the variable document are discharged, these being the pages shown in FIG. 18 and the pages shown in FIG. 19. Accordingly, compared to a case where for example the contents of a variable document have been discharged as shown in FIG. 4 (eight pages), the number of pages to be discharged is four pages fewer.

Document Output Operation

When the operator confirms the pages of FIG. 18 and the pages of FIG. 19 and confirms that there is no problem in regard to the content of the variable document, an operation is carried out at the input unit 106 giving instruction for output of the variable document.

When this operation is carried out, the image forming apparatus 1 generates images of the documents shown in FIG. 4 in accordance with the document data D1 and the multiple PDF files stored in the storage unit 105. When the generating of images of each of the pages of the first set to the fourth set is finished in the image forming apparatus 1, the generated images of pages are sent to the image processing unit 111.

The image processing unit 111 executes image processing such as tone correction and screen processing on images that have been sent. Then, the image processing unit 111 generates images of each of the colors Y, M, C, and K from the images that have undergone image processing and outputs each of these images to the image forming unit 109. When it receives the images, the image forming unit 109 forms toner images of the received images on the recording paper, and the recording paper on which the toner images have been formed is discharged outside the image forming apparatus 1.

MODIFIED EXAMPLES

Description was given above concerning one exemplary embodiment of the present invention, but the present invention is not limited to the above-described exemplary embodiment and may be implemented in various other forms. For example, the above-described exemplary embodiment may be modified as follows to implement the present invention.

In the above-described exemplary embodiment, on pages in which an image of a variable portion has been formed, only images of the variable portions are formed, but it is also possible that, as shown in FIG. 20, the image forming apparatus 1 forms images of numbers indicating the document of which set for images of each of the variable portions are to be formed.

Specifically, when the image forming apparatus 1 reads out the identification numbers and the file names of images of variable portions at step SA6, it reads out numbers (the set numbers in FIG. 17) indicating which set of the document the image of the file name is being used.

Then, when the image forming apparatus 1 forms the page images of the images of the variable portions, it generates images of the file names and also generates images of the set numbers that have been read out along with the file names, and arranges the images of the set numbers near the images of the file names.

For example, in the case of the document shown in FIG. 4, the image of "To Mr/Ms A," which is an image of a variable portion, is to be formed in the first set of the document, and therefore an image of a number "1" is formed near the text string of "To Mr/Ms A" as shown in FIG. 20.

It should be noted that when the image forming apparatus 1 outputs the numbers indicating which set of the document the images of the variable portions are being used along with the images of the variable portions, it may output these using a table format as shown in FIG. 21.

Furthermore, in the aforementioned exemplary embodiment, an identification number that uniquely identifies each position is assigned to the positions of the images of the variable portions, but as long as each position can be uniquely identified, rather than a number, alphabetic characters or characters or the like of another language may be used as identifiers.

In the aforementioned exemplary embodiment, when the image forming apparatus 1 analyzes the information of the images of the variable portions at step SA2, it may also extract information (information of a region described with the <CLIP_RECT> tag) that indicates display regions of the images of the variable portions from the document data.

Then, the image forming apparatus 1 may be configured to superimpose the extracted display regions and the regions of images of variable portions, and perform image forming of images of the variable portions on pages to be displayed for images among the images of variable portions that fit within the extracted display region, and to not perform image forming of images of the variable portions on pages to be displayed for portions that protrude from the extracted display region.

In this configuration, in a case where the variable image P21 protrudes from the region B2 indicated by a dashed line as shown in FIG. 22 for example, at step SA6, an image of the variable portion is generated for the image that fits inside the display region, and an image of the variable portion is not generated for the portion that protrudes from the extracted display region as shown in FIG. 23.

It should be noted that in a case where the images of the variable portions are to undergo rotation processing in this configuration, the image forming apparatus 1 may be configured to perform image forming of the images of the variable portions on the pages to be displayed only for portions of the images after rotation processing that fit in the display region of the images of the variable portions.

Furthermore, in this configuration, the image forming apparatus 1 may be configured to express the size of the regions A1, A2, B1, and B2, which are set in the document data, using dashed lines as shown in FIG. 24 based on information indicating the extracted display regions.

In the aforementioned exemplary embodiment, when the image forming apparatus 1 generates images of the variable portions at step SA6, it may be configured to reduce the size of text for images of text strings more than when combining these with the images of the definite form portions. With this configuration, the number of pages of the images of the variable portions becomes smaller even in a case where there is a large volume of sets to be outputted.

It should be noted that in this configuration, in a case where the number of sets to be outputted is not less than a predetermined number of sets that has been decided in advance, the size of the text for images of text strings may be made smaller than when combining these with the images of the definite form portions when generating the images of the variable portions at step SA6, and in a case where the number of sets to be outputted is less than a predetermined number of sets that has been decided in advance, the size of the images of text strings may be set as the same size as when combining these with the images of the definite form portions when generating the images of the variable portions at step SA6.

In the aforementioned exemplary embodiment, the image forming apparatus 1 outputs pages of the images of the definite form portions and pages of the images of the variable portions, but it is also possible not to form the images of the variable portions on the recording medium at step SA7 without carrying out the processing of step SA6.

In the aforementioned modified example, it was described that information indicating display regions of the images of the variable portions (information of a region described with a <CLIP_RECT> tag) may be extracted from the document data when analyzing information of the images of the variable portions at step SA2, but in this configuration, the image forming apparatus 1 may be configured to indicate a dashed line expressing the display region based on information indicating the extracted display region on the page in which images of definite form portions are expressed as shown in FIG. 25.

The image forming apparatus 1 may also be configured to count character numbers for images of text strings among the images of the variable portions, and to output on the page for each display region an image of a variable portion displaying a text string of a minimum character number and a text string of a maximum character number.

Figure 26:
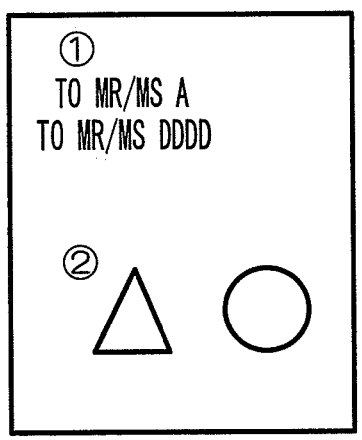
FIG. 26 is a diagram illustrating a page to be outputted according to a modified example of the present invention.

In this configuration, in the case of the document shown in FIG. 4, the image forming apparatus 1 forms images of a text string of the minimum character number as "To Mr/Ms A" and a text string of the maximum character number as "To Mr/Ms DDDD" on the pages of the images of the variable portions for the region A2 as shown in FIG. 26.

Figure 27:
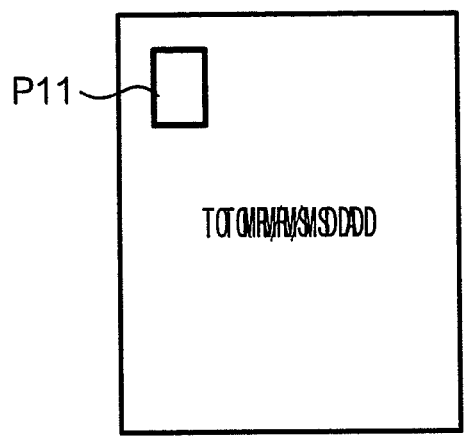
FIG. 27 is a diagram illustrating a page to be outputted according to a modified example of the present invention.

Furthermore, in a configuration in which a text string of a minimum character number and a text string of a maximum character number are extracted for each display region for images of text strings among the images of the variable portions, the extracted text string "To Mr/Ms A" of the minimum character number and the text string "To Mr/Ms DDDD" of the maximum character number may be formed overlaying each other on the page of the images of definite form portions as shown in FIG. 27.

It should be noted in regard to images of the variable portions that the image forming apparatus 1 may be configured to extract the sizes of images for diagrams from the document data and to form an image of the minimum and an image of the maximum overlaying each other on the page of the images of definite form portions.

In the document illustrated in FIG. 4, the document of each of the first set to the fourth set has a same number of regions in which images of the variable portions are to be formed, but any of the documents may have a number of regions in which images of the variable portions are to be formed that is different from the other documents.

In this case, the image forming apparatus 1 may be configured to analyzed the document data and specify an element group in which a document having the most regions of images of variable portions is defined, and to form and output the document images in accordance with the specified element group.

According to this configuration, when the operator carries out an operation of giving instruction for the document having the largest number of regions of images of the variable portions to be outputted, in a case where the largest number of regions of images of the variable portions is in the first set as shown in the document of FIG. 28 for example, only the document of the first set is outputted.

In the aforementioned exemplary embodiment, the document data is described in accordance with PPML, but as long as it is a page description language capable of expressing a structure of a variable document, the document data may be described in a different page description language rather than PPML. Furthermore, in the aforementioned exemplary embodiment, the files that express images are PDF files, but the format of the files is not limited to PDF and may be a different file format as long as it is a format capable of expressing images and that is interpretable by the image forming apparatus 1.

Figure 29:
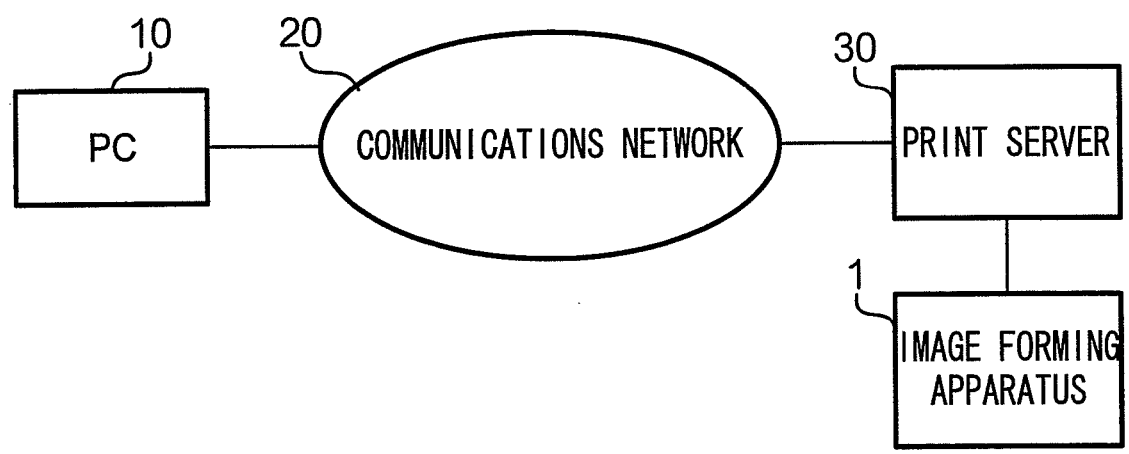
FIG. 29 is a configuration diagram of a system according to a modified example of the present invention.

With an aspect of the present invention, a configuration of a system having the image forming apparatus 1 may also be configured such that a print server 30 is connected to the communications network 20 as shown in FIG. 29, and the print server 30 connects to the image forming apparatus 1.

The print server 30 is a computer apparatus provided with components such as a CPU, a ROM, a RAM, a storage device, a keyboard, a display device, and a communications interface. In this configuration, the document data and PDF files sent from the PC 10 are received by the print server 30.

Then, when the operator carries out an operation giving instruction that images of definite form portions and images of variable portions of the variable document are to be outputted separately, the print server 30 carries out the processing from step SA1 to step SA6 as shown in FIG. 16. After this, the print server 30 sends information expressing page images of images of the definite form portions generated at step SA5 and information expressing page images of images of the variable portions generated at step SA6 to the image forming apparatus 1, and upon receiving these sets of information, the image forming apparatus 1 may output pages of images of the definite form portions and pages of the images of the variable portions in accordance with the received information in a same manner as the aforementioned exemplary embodiment.

It should be noted that in a configuration provided with the print server 30 in this manner, the print server 30 may be configured such that information relating to colors of the document is correctable using the keyboard, and instruction is given to the image forming apparatus 1 for output of the document in which information relating to color has been converted.

In the aforementioned exemplary embodiment, the images generated at step SA5 and step SA6 are formed on a recording medium, but rather than output by forming on the recording medium, it is also possible to display these on a display device of the display 107.

Furthermore, in the system provided with the print server 30, the images generated by the processing of step SA5 and the images generated by the processing of step SA6 may be displayed on a display device provided for the print server 30.

In the aforementioned exemplary embodiment, it is also possible that a program enabling the CPU 102 to carry out the processing of steps SA1 to SA6 is stored in the storage unit 105 and the processing of steps SA1 to SA6 is executed by the CPU 102 executing this program such that images of definite form portions and images of variable portions are generated.

In the image forming apparatus 1 and the print server 30, it is of no concern whether the functionality of separately generating pages having images of definite form portions and pages having images of the variable portions is achieved by hardware or achieved by software. It should be noted that this functionality is achieved in the image forming apparatus 1 by executing a control program stored in the ROM 103, but it is also possible to store this program on a storage medium such as a ROM to be provided to the image forming apparatus 1, and it is also possible that the program is stored on a computer readable magnetic storage medium or optical storage medium, then the program stored on these storage media is read by the computer apparatus and installed on the image forming apparatus 1 via the computer apparatus. Furthermore, installation is also possible by downloading to the image forming apparatus 1 via a communications network such as the Internet. Furthermore, in a same manner as the image forming apparatus 1, the print server 30 may read and install the program stored on the various storage media and may also perform installation by downloading the program via a communications network.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus processing a document having plurality of sets and represented by document data, comprising:
    a first specifying unit that specifies definite form portions, the definite form portions including form images that are identical in each set of the plurality of sets;
    a second specifying unit that specifies variable portions of the document, in which variable images are to be substituted in each set of the plurality of sets; and
    an output unit that outputs a definite form portion page and a variable portion page,
    the definite form portion page having arranged thereon:

a form image of the definite form portion specified by the first specifying unit is arranged in a position of the definite form portion in the document, a text string of a minimum number of characters that is to be substituted into the variable portion, and a text string of a maximum number of characters that is to be substituted into the variable portion is arranged for variable portions into which text strings are to be substituted, selected from among variable portions specified by the second specifying unit; and the variable portion page having arranged thereon:

a variable image to be substituted into the variable portion, wherein images of text strings among the variable images of the variable portions are not arranged, wherein the text string of a maximum number of characters and the text string of a minimum number of characters are arranged to overlap in the variable portion.

2. The image forming apparatus according to claim 1, wherein the output unit combines the definite form image and the variable image in a same page.

3. The image forming apparatus according to claim 1, wherein the image forming apparatus is configured to count character numbers for the images of text strings among the variable images of the variable portions.

4. An image forming apparatus processing a document having plurality of sets and represented by document data, comprising:

a first specifying unit that specifies definite form portions, the definite form portions including form images that are identical in each set of the plurality of sets;

a second specifying unit that specifies variable portions of the document, in which variable images are to be substituted in each set of the plurality of sets; and an output unit that outputs a definite form portion page and a variable portion page, the definite form portion page having arranged thereon:

a form image of the definite form portion specified by the first specifying unit is arranged in a position of the definite form portion in the document, a text string of a minimum number of characters that is to be substituted into the variable portion, and a text string of a maximum number of characters that is to be substituted into the variable portion is arranged for variable portions into which text strings are to be substituted, selected from among variable portions specified by the second specifying unit; and the variable portion page having arranged thereon:

a variable image to be substituted into the variable portion, wherein images of text strings among the variable images of the variable portions are not arranged, wherein the variable images of the variable portion are arranged to overlap.

* * * * *